2,971,995

PRODUCTION OF OLEFINS

Robert P. Arganbright, Galveston, Tex., assignor to Monsanto Chemical Company, St. Louis, Mo., a corporation of Delaware No Drawing. Filed June 22, 1959, Ser. No. 821,626

3 Claims. (Cl. 260—683.3)

This invention relates to an improved process for the production of olefins from saturated hydrocarbons. More particularly, it relates to the production of propylene from propane.

It is well known that olefins can be obtained by thermal decomposition of petroleum-derived hydrocarbons. Propylene can be obtained, for example, by the thermal conversion of propane. However, in such a process, the cracked gas product contains in addition to the desired propylene, significant amounts of other products such as methane, ethylene, acetylene, and butenes. Also non-gaseous hydrocarbons such as oils, tars, and normally cyclic hydrocarbons are formed simultaneously. Provision must be made for removal of such contaminants because they lead to fouling of the apparatus and equipment. Likewise in order to recover the propylene in sufficiently pure form for its utilization, the gaseous cracked product must be processed by fractionation in a series of steps requiring fairly elaborate equipment and time-consuming operations.

Some of the problems inherent in the production of propylene by cracking techniques can be obviated by producing the olefin in a relatively pure state by dehydrochlorination of propyl chloride. While this method is generally satisfactory, it ordinarily involves a multi-step process wherein propane is chlorinated by reaction with chlorine, the alkyl chloride is separated from the concomitant chlorinated by-products and the alkyl chloride is then dehydrochlorinated. To make the process practical from an economic point of view, there must be some outlet for the hydrogen chloride produced or the latter must be converted back to chlorine. The various reaction steps all require different apparatus, different reaction conditions, different catalysts, etc. Thus, the advantages of a process wherein conversion of propane to propylene could be effected with fewer operational steps and less by-product formation are immediately obvious.

It is an object of the present invention to provide a process wherein propane can be readily converted to propylene in a relative simple process and with comparatively little loss to non-useful by-products. Other objects and advantages of the invention will be apparent from the following description. According to the invention a mixture of propane, hydrogen chloride and oxygen or air is contacted at an elevated temperature with a catalyst consisting of magnesium chloride supported upon pumice to produce an effluent gas mixture from which propylene can be recovered in good yield. Only small amounts of chlorinated by-products are produced which are readily separable from the desired olefin, fewer steps are required for separation of proplyene from the unreacted propane, and the hydrogen chloride produced is continuously re-used in the process.

The invention is illustrated in the following examples which, however, are not to be construed as limiting it in any manner whatsoever.

Example 1

A tubular glass reactor about 4 ft. long and 40 mm. in diameter wrapped with nichrome wire for heating and covered with asbestos insulation was employed as the reactor. A thermowell containing a thermocouple for measuring temperatures was centrally positioned in the reactor extending throughout its length. The catalyst consisting of magnesium chloride supported upon pumice was charged to the reactor and fluidized by passing nitrogen up through it while the reactor was brought up to reaction temperature. Thereafter, propane, hydrogen chloride and air, at approximate rates of 400 ml./min., 500 ml./min., and 1200 ml./min., respectively, were passed successively through rotameters into a mixer and preheater and then into the reactor where they were contacted with the fluidized catalyst maintained at a temperature within the range from about 480° C.–520° C. As the reactants were introduced, the flow of nitrogen was proportionately reduced so that the velocity of the entering gaseous reactants helped to maintain the catalyst in a fluidized state.

Effluent gases from the top of the reactor were passed through a separator filled with glass wool for removal of any entrained catalyst particles and thence into a series of dry ice traps and finally through a caustic scrubber for removal of unreacted HCl. Off-gas from the scrubber was vented through a wet test meter.

The low-boiling product (<25° C.) recovered from the dry ice trap was analyzed by infrared spectroscopic means and found to contain about 40% propylene, 55% unreacted propane, and traces of acetylene, methane and ethylene. Conversion of propane to propylene was calculated to be about 40% while only 7% of the propane fed went to chlorinated products.

Variations in conditions from those given in the example may be made without departing from the scope of the invention. The reaction may be carried out by mixing the propane with hydrogen chloride and air or oxygen and passing the mixture in contact with the catalyst in a heated reaction chamber; or if desired, the mixture may be introduced into the reaction zone in three separate streams; or the air or oxygen may be introduced into a mixture of propane and hydrogen chloride. Precaution should be taken to avoid allowing propane and oxygen to reach reaction temperature in the absence of hydrogen chloride.

In the preferred embodiment of the invention, the catalyst is employed in the fluidized or pseudo liquid state. It is maintained in a fluid or suspended state by the gaseous reactants themselves or optionally, by the use of an additional inert gas introduced from an outside source. The use of a fixed bed operation, however, is not outside the scope of the invention.

The relative proportions of the reactants may vary considerably. Preferred proportions are those corresponding to the stoichiometric proportions required to effect substitution chlorination of the propane charged, that is, a 1:1:0.5 ratio of propane to HCl to oxygen, or 1:1:2.5 if air is used instead of oxygen. Since HCl is not consumed in the reaction, only very small amounts, if any, of this reactant need be fed once the reaction has been initiated if provision is made for recycle of HCl. Excesses of propane and air may be employed if desired without significantly affecting the reaction.

Contact time is not too critical and may vary from about 0.5 to about 12 seconds.

Reaction temperature is a critical factor and the temperature must be maintained above about 450° C. to effect the reaction. Preferably, the temperature is maintained in the range from about 480° C. to about 520 C. Although temperatures above 520° and up to 600° C.

can be employed, some carbon begins to deposit on the catalyst at these higher temperatures.

The catalyst for the process is readily prepared by saturating pumice with a solution, aqueous or otherwise, of magnesium chloride and filtering and drying the impregnated pumice. Further drying may be effected by means of a flow of nitrogen (or other inert gas), hydrogen chloride and/or air through the mass of catalyst while it is being heated to reaction temperature after it has been charged to the reactor. A more active catalyst is prepared from a methanolic solution of magnesium chloride. Better catalytic activity has also been observed for a catalyst prepared and dried under vacuum. The catalyst may be readily regenerated by heating with air at a temperature of about 500° C. to "burn off" any deposited carbon from its surface.

What is claimed is:

1. A process for the production of propylene which comprises reacting propane with hydrogen chloride and oxygen in the presence of a catalyst which consists essentially of magnesium chloride supported upon pumice at a temperature above about 450° C.

2. A process for the production of propylene which comprises reacting propane with hydrogen chloride and oxygen at a temperature in the range from about 450° C.–600° C. in the presence of a catalyst which consists essentially of magnesium chloride supported upon pumice.

3. A process for the production of propylene which comprises reacting propane with hydrogen chloride and oxygen in the molecular ratio of 1:1:0.5 at a temperature in the range from about 480° C. to about 520° C. in the presence of a catalyst which consists essentially of magnesium chloride supported upon pumice.

References Cited in the file of this patent

UNITED STATES PATENTS

| | | |
|---|---|---|
| 1,925,421 | van Peski | Sept. 5, 1933 |
| 2,259,195 | Baehr et al. | Oct. 14, 1941 |
| 2,315,499 | Cantzler et al. | Apr. 6, 1943 |
| 2,890,253 | Mullineaux et al. | June 9, 1959 |

FOREIGN PATENTS

| | | |
|---|---|---|
| 849,804 | France | Aug. 28, 1939 |